(12) United States Patent
Morii et al.

(10) Patent No.: US 9,302,317 B2
(45) Date of Patent: Apr. 5, 2016

(54) METHOD FOR MANUFACTURING HOLLOW ENGINE VALVE

(75) Inventors: Hirokazu Morii, Tokyo (JP); Kenichiro Hirao, Tokyo (JP); Hyoji Yoshimura, Nagoya (JP)

(73) Assignees: MITSUBISHI HEAVY INDUSTRIES, LTD., Tokyo (JP); YOSHIMURA COMPANY, Aichi (JP)

( * ) Notice: Subject to any disclaimer, the term of this patent is extended or adjusted under 35 U.S.C. 154(b) by 320 days.

(21) Appl. No.: 14/001,994

(22) PCT Filed: Feb. 17, 2012

(86) PCT No.: PCT/JP2012/053751
§ 371 (c)(1),
(2), (4) Date: Sep. 12, 2013

(87) PCT Pub. No.: WO2012/127947
PCT Pub. Date: Sep. 27, 2012

(65) Prior Publication Data
US 2014/0033533 A1 Feb. 6, 2014

(30) Foreign Application Priority Data
Mar. 22, 2011 (JP) ................... 2011-062198

(51) Int. Cl.
*B23P 15/00* (2006.01)
*B21K 1/24* (2006.01)
(Continued)

(52) U.S. Cl.
CPC ... *B21K 1/24* (2013.01); *B21K 1/22* (2013.01); *B23P 15/002* (2013.01); *F01L 3/14* (2013.01); *F01L 3/20* (2013.01); *F01L 2103/00* (2013.01); *Y10T 29/49405* (2015.01)

(58) Field of Classification Search
CPC ............. B21K 1/24; B21K 1/22; F01L 3/20; F01L 3/14; F01L 2103/00; B23P 15/002; Y10T 29/49405
See application file for complete search history.

(56) References Cited

U.S. PATENT DOCUMENTS 1,984,751 A 12/1934 McBridge et al.
1,992,245 A 2/1935 Scrimgeour
(Continued)

FOREIGN PATENT DOCUMENTS

CN 1094123 A 10/1994
DE 19746235 A1 5/1998
(Continued)

OTHER PUBLICATIONS

International Search Report and Written Opinion of the International Searching Authority with English translation.
(Continued)

*Primary Examiner* — Sarang Afzali
*Assistant Examiner* — Ruth G Hidalgo-Hernandez
(74) *Attorney, Agent, or Firm* — Birch, Stewart, Kolasch & Birch, LLP

(57) ABSTRACT

A method for manufacturing a hollow engine valve includes a step for performing rotational plastic working on a follow engine valve body semifinished product which is configured from a shaft part and a valve umbrella part forming portion connected to the shaft part. A columnar hole part is formed from the shaft part to an enlarged diameter section of the valve umbrella part forming portion to thereby reduce the diameter of the shaft part. A necking step follows the rotational plastic working step, necking the hollow engine valve body semifinished product to thereby reduce the outer diameter and the inner diameter of the shaft part. A sealing step seals the leading end of the shaft part to obtain the hollow engine valve.

10 Claims, 6 Drawing Sheets

(51) Int. Cl.
*B21K 1/22* (2006.01)
*F01L 3/14* (2006.01)
*F01L 3/20* (2006.01)

(56) References Cited

U.S. PATENT DOCUMENTS

| | | |
|---|---|---|
| 2,029,508 A | 2/1936 | Scrimgeour |
| 2,411,734 A | 11/1946 | Kerwin et al. |
| 5,413,073 A | 5/1995 | Larson et al. |
| 5,458,314 A | 10/1995 | Bonesteel |
| 5,619,796 A | 4/1997 | Larson et al. |

FOREIGN PATENT DOCUMENTS

| | | | |
|---|---|---|---|
| EP | 0265919 A1 | 5/1988 | |
| EP | 2 325 446 A1 | 5/2011 | |
| JP | 8-210112 A | 8/1996 | |
| JP | 10-166098 A | 6/1998 | |
| JP | 2003-136131 A | 5/2003 | |
| JP | 2009-185655 A | 8/2009 | |
| JP | 4390291 B1 | 10/2009 | |
| WO | WO 2011104903 A1 * | 9/2011 | ........... B21D 41/045 |

OTHER PUBLICATIONS

European Communication pursuant to Rule 114(2) EPC, dated Jan. 16, 2015, for European Application No. 12760300.9.

Extended European Search Report, dated Jan. 21, 2015, for European Application No. 12760300.9.

TRW, "Handbook 1st English Edition, 1993 with guidelines on valve design", TRW Automotive Engine Components, Received at the EPO on Dec 2, 2014, 2 Pages.

Chinese Office Action dated Feb. 4, 2015 issued in corresponding Chinese Application No. 201280009242.6 with an English Translation.

* cited by examiner

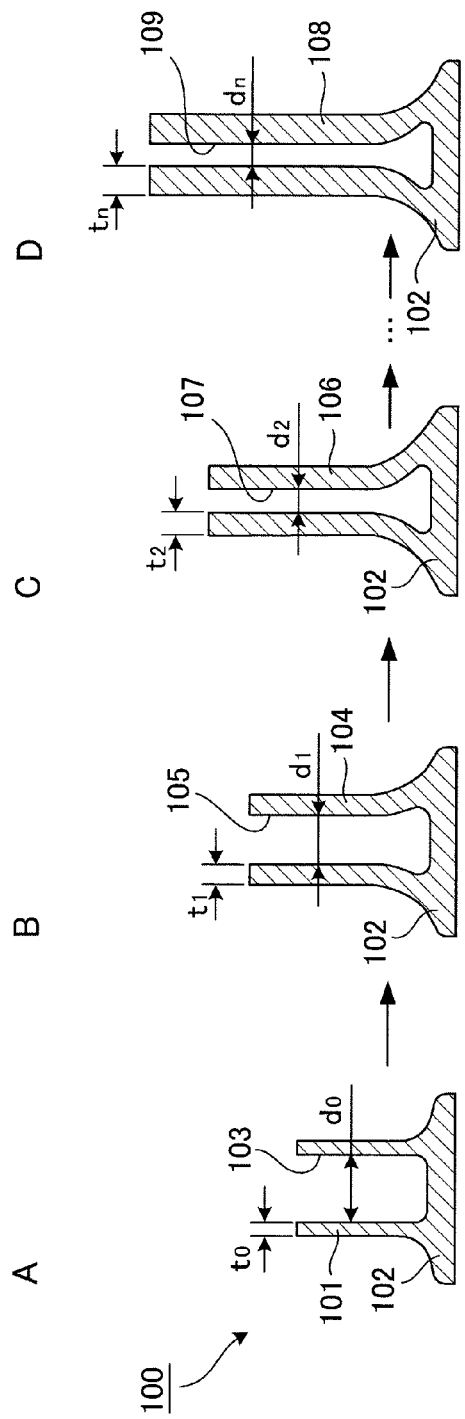

METHOD FOR MANUFACTURING HOLLOW ENGINE VALVE

TECHNICAL FIELD

The present invention relates to a method for manufacturing a hollow engine valve having a hollow portion formed from a stem part (body part) to a widening portion of a valve head part.

BACKGROUND ART

Various methods for manufacturing a hollow engine valve have been developed, and there have been methods which mold a hollow engine valve by forging. For example, Patent Document 1 discloses a method for manufacturing a valve head part of a hollow engine valve and a hollow engine valve.

The manufacturing method described in Patent Document 1 obtains a hollow engine valve body by: molding a cup-shaped intermediate member by boring a columnar hole in the upper surface of a solid circular rod (a columnar billet) by hot forging with a punch; molding a valve head part forming part by widening a lower portion of the rod by forging; and performing necking on the rod multiple times to gradually narrow an upper portion of the valve head part forming part and thereby form a valve head part and a hollow stem part connected thereto.

PRIOR ART DOCUMENT

Patent Document

Patent Document 1: Japanese Patent No. 4390291 (see [Embodiment 1], [FIG. 1] to [FIG. 4], etc, for example)

SUMMARY OF INVENTION

Problem to be Solved by the Invention

In the method for manufacturing a hollow engine valve described above, the valve body is obtained by molding a semifinished hollow engine valve body as shown in FIG. 6. First, as shown in Part A of FIG. 6, a semifinished hollow engine valve body 100 is prepared which includes a stem part (body part) 101 of a thickness to and a valve head part forming part 102 connected to thereto. In the semifinished hollow engine valve body 100, a hole portion 103 of a diameter $d_0$ is formed from the stem part 101 to a widening portion of the valve head part forming part 102. Then, the first necking is performed, so that a stem part 104 has a thickness $t_1$ ($>t_0$) and a hole portion 105 has a diameter $d_1$ ($<d_0$) as shown in Part B of FIG. 6. Thereafter, the second necking is performed, so that a stem part 106 has a thickness $t_2$ ($>t_1$) and a hole portion 107 has a diameter $d_2$ ($<d_1$) as shown in Part C of FIG. 6. The necking is repeated multiple times as described above. By performing the n-th necking, a stem part 108 has a thickness $t_n$ ($>t_{(n-1)}$) and a hole portion 109 has a diameter $d_n$ ($<d_{(n-1)}$) as shown in Part D of FIG. 6.

In the necking described above, a mandrel (core) cannot be set inside the hole portion of the semifinished hollow engine valve body. For this reason, narrowing the stem part by necking increases the thickness of the stem part by the number of times the process is performed. Thus, the thickness of the stem part of the semifinished hollow engine valve body and the number of times necking is performed limit the thickness of the stem part of the hollow engine valve body. Meanwhile, in order to prevent buckling deformation in which the stem part bends and the like, it is necessary for the thickness of the stem part of the semifinished hollow engine valve body to be a predetermined size or larger. As described above, with the method for manufacturing a hollow engine valve described above, it is difficult to obtain a hollow engine valve having a stem part of a desired thickness.

In view of the above, the present invention has been made to solve the above-described problem, and an object thereof is to provide a method for manufacturing a hollow engine valve capable of manufacturing a hollow engine valve having a stem part of a desired thickness relatively easily.

Means for Solving the Problem

A method for manufacturing a hollow engine valve according to a first invention to solve the above described problem is a method for manufacturing a hollow engine valve having a hollow portion formed from a stem part to a widening portion of a valve head part, characterized in that the method comprises:

a first rotary plastic working step of performing rotary plastic working on a semifinished hollow engine valve body which includes a stem part and a valve head part forming part connected to the stem part, to thereby narrow the stem part, the semifinished hollow engine valve body having a columnar hole portion formed from the stem part to a widening portion of the valve head part forming part;

a necking step of, after the first rotary plastic working step, performing necking on the semifinished hollow engine valve body to thereby reduce an outer diameter and an inner diameter of the stem part, the necking using as many dies as the number of narrowing operations to thereby narrow the widening portion of the valve head part forming part and the stem part of the semifinished hollow engine valve body stepwisely, the dies being configured to press the widening portion and the stem part and having die holes with inner diameters decreasing slightly and successively according to a sequence of the operations; and a sealing step of, after the necking step, sealing a tip of the stem part to thereby obtain the hollow engine valve.

A method for manufacturing a hollow engine valve according to a second invention to solve the above described problem is the method for manufacturing a hollow engine valve according to the first invention, characterized in that the rotary plastic working is any one of: rotary swaging including inserting a core inside the hole portion of the semifinished hollow engine valve body, and striking an outer peripheral portion of the stem part with a swaging die while axially rotating the semifinished hollow engine valve body and the core together; and spinning including inserting a core inside the hole portion of the semifinished hollow engine valve body, and pressing a spinning die against the outer peripheral portion of the stem part while axially rotating the semifinished hollow engine valve body and the core together.

A method for manufacturing a hollow engine valve according to a third invention to solve the above described problem is the method for manufacturing a hollow engine valve according to the first invention, characterized in that the rotary plastic working is a combination of:

performing any one of rotary swaging including striking an outer peripheral portion of the stem part with a swaging die while axially rotating the semifinished hollow engine valve body, and spinning including pressing a spinning die against the outer peripheral portion of the stem part while axially rotating the semifinished hollow engine valve body; and performing, after the any one of the rotary swaging and the spinning, any one of rotary swaging including inserting a core inside the hole portion of the semifinished hollow engine valve body, and striking the outer peripheral portion of the shaft part with a swaging die while axially rotating the semifinished hollow engine valve body and the core together, and spinning including inserting a core inside the hole portion of the semifinished hollow engine valve body, and pressing a spinning die against the outer peripheral portion of the stem part while axially rotating the semifinished hollow engine valve body and the core.

A method for manufacturing a hollow engine valve according to a fourth invention to solve the above described problem is the method for manufacturing a hollow engine valve according to the first invention, characterized in that the method further comprises a second rotary plastic working step of performing rotary plastic working on the semifinished hollow engine valve body after performing the necking thereon, to thereby reduce the outer diameter of the stem part while maintaining the size of the inner diameter thereof as is.

A method for manufacturing a hollow engine valve according to a fifth invention to solve the above described problem is the method for manufacturing a hollow engine valve according to the fourth invention, characterized in that the rotary plastic working in the second rotary plastic working step is any one of: rotary swaging including inserting a core inside the hole portion of the semifinished hollow engine valve body, and striking an outer peripheral portion of the stem part with a swaging die while axially rotating the semifinished hollow engine valve body and the core together; and spinning including inserting a core inside the hole portion of the semifinished hollow engine valve body, and pressing a spinning die against the outer peripheral portion of the stem part while axially rotating the semifinished hollow engine valve body and the core together.

A method for manufacturing a hollow engine valve according to a sixth invention to solve the above described problem is the method for manufacturing a hollow engine valve according to the fourth invention, characterized in that the rotary plastic working in the second rotary plastic working step is performed only on a portion of the stem part other than an upper portion thereof, so that the outer diameter of the stem part is reduced while the size of the inner diameter thereof is maintained as is except the upper portion, whereas the outer diameter of the upper portion of the stem part is maintained at the size thereof before the rotary plastic working to thereby form a large diameter portion, and in the sealing step, the large diameter portion is pressed to seal a tip of the stem part and thereby obtain the hollow engine valve.

A method for manufacturing a hollow engine valve according to a seventh invention to solve the above described problem is a method for manufacturing a hollow engine valve having a hollow portion formed from a stem part to a widening portion of a valve head part, characterized in that the method comprises:

a first necking step of performing necking on a semifinished hollow engine valve body which includes a stem part and a shaft head part forming part connected to the stem part and has a columnar hole portion formed from the stem part to a widening portion of the valve head part forming part, to thereby reduce an outer diameter and an inner diameter of the stem part, the necking using as many dies as the number of narrowing operations to thereby narrow the widening portion of the valve head part forming part and the stem part of the semifinished hollow engine valve body stepwise, the dies being configured to press the widening portion and the stem part and having die holes with inner diameters decreasing slightly and successively according to a sequence of the operations;

a rotary plastic working step of, after the first necking step, performing rotary plastic working on the semifinished hollow engine valve body to thereby narrow the stem part; and a sealing step of, after the rotary plastic working step, sealing a tip of the stem part to thereby obtain the hollow engine valve.

A method for manufacturing a hollow engine valve according to an eighth invention to solve the above described problem is the method for manufacturing a hollow engine valve according to the seventh invention, characterized in that the rotary plastic working is any one of: rotary swaging including inserting a core inside the hole portion of the semifinished hollow engine valve body, and striking an outer peripheral portion of the stem part with a swaging die while axially rotating the semifinished hollow engine valve body and the core together; and spinning including inserting a core inside the hole portion of the semifinished hollow engine valve body, and pressing a spinning die against the outer peripheral portion of the stem part while axially rotating the semifinished hollow engine valve body and the core together.

A method for manufacturing a hollow engine valve according to a ninth invention to solve the above described problem is the method for manufacturing a hollow engine valve according to the seventh invention, characterized in that the method further comprises a second necking step of, after performing the rotary plastic working on the semifinished hollow engine valve body, performing necking to thereby reduce the outer diameter and the inner diameter of the stem part, the necking using as many dies as the number of narrowing operations to thereby narrow the widening portion of the valve head part forming part and the stem part of the semifinished hollow engine valve body stepwise, the dies being configured to press the widening portion and the stem part and having die holes with inner diameters decreasing slightly and successively according to a sequence of the operations.

A method for manufacturing a hollow engine valve according to a tenth invention to solve the above described problem is the method for manufacturing a hollow engine valve according to the seventh invention, characterized in that the rotary plastic working is performed only on a portion of the stem part other than an upper portion thereof, so that the outer diameter of the stem part is reduced while the size of the inner diameter thereof is maintained as is except the upper portion, whereas the outer diameter of the upper portion of the stem part is maintained at the size thereof before the rotary plastic working to thereby form a large diameter portion, and in the sealing step, the large diameter portion is pressed to seal a tip of the stem part and thereby obtain the hollow engine valve.

Effects of the Invention

In the method for manufacturing a hollow engine valve according to the first or second invention, rotary swaging is performed before necking is performed. Therefore, the thickness of the stem part can be made uniform in the circumferential direction and in the axial direction. Accordingly, the yield in the subsequent necking step can be improved. Moreover, because the method only involves performing necking after performing rotary swaging, a hollow engine valve having a stem part of a desired thickness can be manufactured relatively easily.

The method for manufacturing a hollow engine valve according to the third invention can achieve the same operation and effect as those by the method for manufacturing a hollow engine valve according to the first invention. In addition to this, because rotary swaging or spinning using no core is performed before performing rotary swaging or spinning using a core, it is possible to adjust the outer diameter and the thickness of the stem part of the semifinished hollow engine valve body.

The method for manufacturing a hollow engine valve according to the fourth invention can achieve the same operation and effect as those by the method for manufacturing a hollow engine valve according to the first invention. In addition to this, because rotary plastic working is performed after performing necking, it is possible to adjust the outer diameter of the stem part of the semifinished hollow engine valve body to a desired size. Furthermore, it is possible to improve the processing accuracy of the inner diameter of the stem part of the hollow engine valve as compared to methods for manufacturing a hollow engine valve in which necking is performed in the last step.

The method for manufacturing a hollow engine valve according to the fifth invention can achieve the same operation and effect as those by the method for manufacturing a hollow engine valve according to the fourth invention. In addition to this, because rotary swaging or spinning using a core is performed after necking is performed, it is possible to adjust the outer diameter of the stem part of the hollow engine valve to a desired size. Moreover, it is possible to improve the processing accuracy of the inner diameter of the stem part of the hollow engine valve as compared to methods for manufacturing a hollow engine valve in which necking is performed in the last step.

In the method for manufacturing a hollow engine valve according to the seventh or eighth invention, rotary plastic working is performed after necking is performed to change the inner diameter of the stem part to a desired size. Therefore, it is possible to adjust the cuter diameter of the stem part of the hollow engine valve to a desired size. Moreover, it is possible to improve the processing accuracy of the inner diameter of the stem part of the hollow engine valve as compared to methods for manufacturing a hollow engine valve in which necking is performed in the last step.

In the method for manufacturing a hollow engine valve according to the ninth invention, rotary plastic working is performed after necking is performed, and necking is further performed after this process. Therefore, it is possible to use a core with a larger diameter in the rotary plastic working than those in cases where the stem part of a hollow engine valve is molded by performing rotary plastic working after necking is performed. Accordingly, it is possible to reduce complication of the manufacturing work.

In the method for manufacturing a hollow engine valve according the sixth or tenth invention, the end of the stem part can be closed by a series of processing operations. Thus, it is not necessary to separately prepare a member to close the end of the stem part. Accordingly, the manufacturing steps can be simplified.

BRIEF DESCRIPTION OF THE DRAWINGS

FIG. 6 is a diagram for describing a conventional method for manufacturing a hollow engine valve. Part A of FIG. 6 shows a cross-sectional view of a semifinished hollow engine valve body before processed; Part B of FIG. 6 shows a cross-sectional view after the first necking; Part C of FIG. 6 shows a cross-sectional view after the second necking; and Part D of FIG. 6 shows a cross-sectional view after the n-th necking.

MODES FOR CARRYING OUT THE INVENTION

A method for manufacturing a hollow engine valve according to the present invention will be described specifically through embodiments.

Embodiment 1

Figure 1:
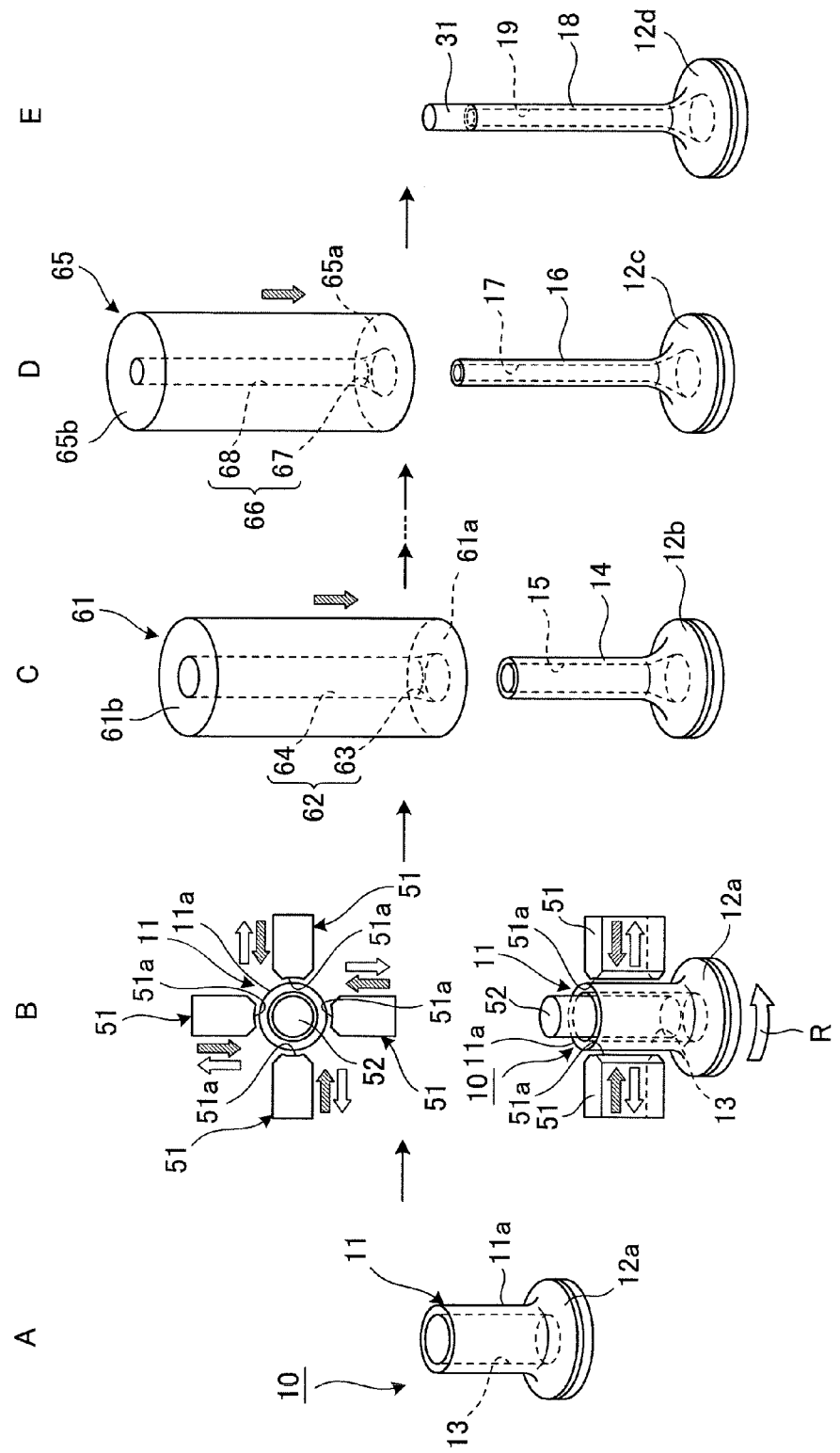
FIG. 1 is a diagram for describing a method for manufacturing a hollow engine valve according to a first embodiment of the present invention. Part A of FIG. 1 shows a perspective view of a semifinished hollow engine valve body before processed; Part B of FIG. 1 shows a state during rotary swaging; Part C of FIG. 1 shows a state during the first necking; Part D of FIG. 1 shows a state during the n-th necking; and Part E of FIG. 1 shows a perspective view of a hollow engine product as a finished product.
Figure 2:
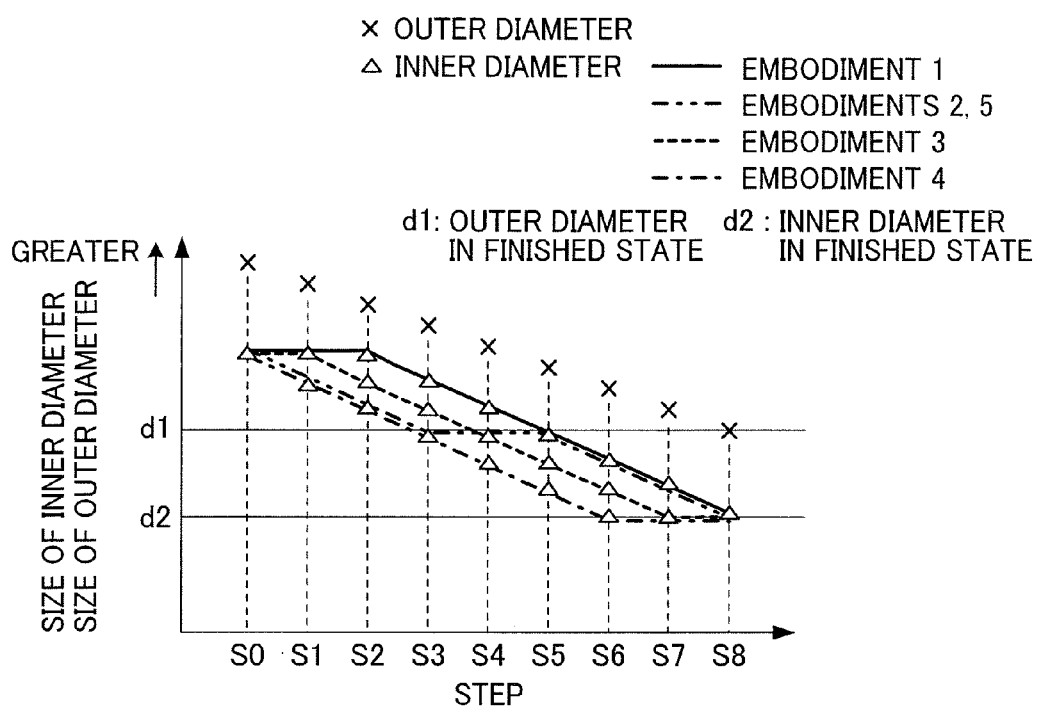
FIG. 2 is a graph showing the correlation between each step in the method for manufacturing a hollow engine valve according to the present invention and the sizes of the inner diameter and the cuter diameter of a corresponding stem part.

A method for manufacturing a hollow engine valve according to a first embodiment of the present invention will be described with reference to FIGS. 1 and 2. In FIG. 2, the horizontal axis indicates each step, while the vertical axis indicates the sizes of the inner diameter and the outer diameter of a stem part of each of a semifinished hollow engine valve body and a hollow engine valve body after the step is processed. Moreover, the crosses indicate the size of the outer diameter of the stem part of each of the semifinished hollow engine valve body and the hollow engine valve body according to Embodiment 1. The triangles indicate the size of the inner diameter of the stem part of each of the semifinished hollow engine valve body and the hollow engine valve body, and the continuous line indicates Embodiment 1. Note that at step S0 (initial state), FIG. 2 shows the size of the inner diameter and the size of the outer diameter of the semifinished hollow engine valve body.

In this embodiment, the semifinished hollow engine valve body is subjected to rotary swaging (rotary plastic working) and thereafter subjected to necking. Specifically, as shown in FIG. 2, the semifinished hollow engine valve body is subjected to rotary swaging in first step S1 to second step S2 (first rotary plastic working step) and subsequently subjected to necking in steps from third step S3 to eighth step S8 (necking step).

A semifinished hollow engine valve body is prepared. As shown in Part A of FIG. 1, a semifinished hollow engine valve body 10 includes a stem part (body part) 11 and a valve head part forming part 12a connected to a lower end portion of the stem part 11. A columnar hole portion 13 is formed from the stem part 11 to a widening diameter portion of the valve head part forming part 12a.

First, the stem part of the semifinished hollow engine valve body is subjected to rotary swaging. For example, as shown in Part B of FIG. 1, a core 52 is set inside the stem part 11 of the semifinished hollow engine valve body 10, and dies (swaging die) 51 are caused to strike an outer peripheral portion 11a of the stem part 11 while the semifinished hollow engine valve body 10 and the core 52 are rotated together in a direction R about the axis of the semifinished hollow engine valve body 10. As a result, the outer diameter of the stem part 11 is reduced. Here, four dies 51, each two of the dies 51 being paired, are used. Each set of dies 51, 51 are disposed facing each other with the stem part 11 at the center. A tip portion 51a of each die 51 is formed in the shape of a surface curving along the stem part 11. This process is performed until the outer diameter of the stem part of the semifinished hollow engine valve body reaches a predetermined size. In this embodiment, rotary swaging using a core is performed in first step S1 to second step S2. As a result, a semifinished hollow engine valve body is obtained which includes a stem part 14 and a valve head part forming part 12b connected to a lower end portion of the stem part 14, and which has a hole portion 15 formed from the stem part 14 to a widening portion of the valve head part forming part 12b. The stem part 14 of this semifinished hollow engine valve body is formed such that its outer diameter may be a predetermined size (>d1).

Subsequently, the semifinished hollow engine valve body thus obtained by the above-described rotary swaging is subjected to necking. Specifically, the semifinished hollow engine valve body is subjected to necking which uses as many dies as the number of narrowing operations to thereby narrow the widening portion of the valve head part forming part and the stem part of the semifinished hollow engine valve body stepwisely. The dies are configured to press the widening portion and the stem part and have die holes with inner diameters decreasing slightly and successively according to the sequence of the operations. For example, in the first narrowing operation, necking is performed by using a die 61 as shown in Part C of FIG. 1. First, the die 61 is disposed above the semifinished hollow engine valve body. A columnar die hole 62 is formed in the die 61 from a lower surface portion 61a to an upper surface portion 61b. The die hole 62 has: a narrowing portion 63 which opens at the lower surface portion 61a and decreases in diameter toward the upper side; and a same diameter portion 64 which extends while maintaining the same diameter from a lower portion to an upper portion thereof. Because the narrowing portion 63 is formed opening at the lower surface portion 61a of the die 61, the stem part 14 of the semifinished hollow engine valve body can be smoothly guided into the same diameter portion 64 of the die 61. Thereafter, with the stem part 14 of the semifinished hollow engine valve body and the die hole 62 of the die 61 being arranged coaxially, the die 61 is pressed against the semifinished hollow engine valve body to narrow the stem part 14 of the semifinished hollow engine valve body with the die 61. As a result, the stem part 14 is stretched in the axial direction. Moreover, the stem part 14 becomes thicker than before the necking. The inner diameter and the outer diameter of the hole portion 15 in the stem part 14 become smaller than before the necking.

Then, once the outer diameter of the stem part is reduced, the die is replaced with one matching the size of the cuter diameter of this stem part, and this die is used to narrow the stem part. For example, in the n-th narrowing operation, necking is performed by using a die 65 as shown in Part D of FIG. 1. Note that n is a positive number equal to or greater than 2. First, the die 65 is disposed above the semifinished hollow engine valve body obtained by the (n−1)-th narrowing operation. Like the die 61, a columnar die hole 66 is formed in the die 65 from a lower surface portion 65a to an upper surface portion 65b. The die hole 66 has: a narrowing portion 67 which opens at the lower surface portion 65a and decreases in diameter toward the upper side; and a same diameter portion 68 which extends while maintaining the same diameter from a lower portion to an upper portion thereof. The die hole 66 is smaller in diameter than the die hole 62, and the same diameter portion 68 is formed smaller in diameter than the same diameter portion 64. Thereafter, with a stem part 16 of the semifinished hollow engine valve body and the die hole 66 of the die 65 being arranged coaxially, the die 65 is pressed against the semifinished hollow engine valve body to narrow the stem part 16 of the semifinished hollow engine valve body with the die 65. As a result, the stem part 16 is stretched in the axial direction. Moreover, the stem part 16 becomes thicker than before the necking. The inner diameter and the outer diameter of a hole portion 17 in the stem part 16 become smaller than before the necking.

In other words, the above-described necking is performed until the cuter diameter of the stem part of the semifinished hollow engine valve body reaches a predetermined size d1 and also until the inner diameter of the stem part reaches a predetermined size d2 (<d1) by using the above-described dies in which die holes are formed according to the size of the outer diameter of the stem part. As a result, a hollow engine valve body is obtained in which its stem part 18 has an outer diameter of d1 and a hole portion 19 of the stem part 18 has a diameter of d2. In this embodiment, the necking is performed in third step S3 to eighth step S8.

Subsequently, the hollow engine valve body thus obtained by the above-described necking is processed to adjust the stem part to a predetermined length as needed. Then, in a sealing step, the tip (upper end) of the stem part is sealed to thereby obtain the hollow engine valve. For example, as shown in Part E of FIG. 1, a columnar sealing member 31 may be welded to a tip portion of the stem part 18 to seal the tip of the stem part so as to obtain the hollow engine valve (finished product).

Thus, in the method for manufacturing a hollow engine valve according to this embodiment, rotary swaging is performed before necking is performed. Therefore, the thickness of the stem part can be made uniform in the circumferential direction and in the axial direction. Accordingly, the yield in the subsequent necking step can be improved. Moreover, because the method only involves performing necking after performing rotary swaging, a hollow engine valve having a stem part of a desired thickness can be manufactured relatively easily.

Embodiment 2

A method for manufacturing a hollow engine valve according to a second embodiment of the present invention will be described specifically with reference to FIG. 2. In FIG. 2, the crosses indicate the size of the outer diameter of a stem part of each of a semifinished hollow engine valve body and a hollow engine valve body according to Embodiment 2. The triangles indicate the size of the inner diameter of the stem part of each of the semifinished hollow engine valve body and the hollow engine valve body, and the long dashed double-short dashed line indicates Embodiment 2.

In this embodiment, the rotary swaging (rotary plastic working) in the method for manufacturing a hollow engine valve according to the first embodiment described above is performed in two separate steps. First, rotary swaging is performed without using a core, and then rotary swaging is performed with a core set inside the stem part of the semifinished hollow engine valve body. Specifically, as shown in FIG. 2, a semifinished hollow engine valve body is subjected to rotary swaging using no core in first step S1 to third step S3 (first rotary plastic working step), and then subjected to rotary swaging using a core in fourth step S4 and fifth step S5 (second rotary plastic working step), and thereafter subjected to necking in sixth step S6 to eighth step S8 (necking step).

The semifinished hollow engine valve body is subjected first to rotary swaging using no core. As a result, the inner diameter and the outer diameter of the semifinished hollow engine valve body are reduced. This occurs because there is no core inside the stem part of the semifinished hollow engine valve body, and hence there is no member inside the stem part to receive force applied thereto when dies strike an outer peripheral portion of the stem part. This process is performed until the inner diameter and the outer diameter of the stem part of the semifinished hollow engine valve body reach predetermined sizes. In this embodiment, the rotary swaging using no core is performed in first step S1 to third step S3. Subsequently, rotary swaging is performed with a core set inside the stem part of the semifinished hollow engine valve body thus obtained by the rotary swaging using no core described above. As a result, the outer diameter of the stem part is reduced while the size of the inner diameter is maintained as is. The rotary swaging using a core is performed until the outer diameter of the stem part of the semifinished hollow engine valve body reaches a predetermined size. In this embodiment, the rotary swaging using a core is performed in fourth step S4 to fifth step S5.

Subsequently, the semifinished hollow engine valve body thus obtained by the rotary swaging using a core described above is subjected to necking as in the method for manufacturing a hollow engine valve according to the first embodiment described above. Specifically, the semifinished hollow engine valve body is subjected to necking which uses as many dies as the number of narrowing operations to thereby narrow the valve head part forming part and the stem part of the semifinished hollow engine valve body stepwisely. The dies are configured to press the valve head part forming part and the stem part and have die holes decreasing in diameter slightly and successively according to the sequence of the operations. This process is performed until the outer diameter of the stem part of the semifinished hollow engine valve body reaches the predetermined size d1 and also until the inner diameter of the stem part reaches the predetermined size d2 (<d1). As a result, a hollow engine valve body is obtained in which its stem part 18 has an outer diameter of d1 and a hole portion 19 of the stem part 18 has a diameter of d2. In this embodiment the necking is performed in sixth step S6 to eighth step S8.

Subsequently, the length of the stem part of the hollow engine valve body thus obtained by the above-described necking is adjusted as needed. Then, as in the method for manufacturing a hollow engine valve according to the first embodiment described above, the tip (upper end) of the stem part of the hollow engine valve body is sealed. As a result, the hollow engine valve (finished product) can be obtained.

Thus, the method for manufacturing a hollow engine valve according to this embodiment can achieve the same operation and effect as those by the method for manufacturing a hollow engine valve according to the first embodiment described above. In addition to this, because rotary swaging using no core is performed before performing rotary swaging using a core, it is possible to adjust the outer diameter and the thickness of the stem part of the semifinished hollow engine valve body.

Embodiment 3

A method for manufacturing a hollow engine valve according to a third embodiment of the present invention will be described specifically with reference to FIG. 2. In FIG. 2, the crosses indicate the size of the outer diameter of a stem part of each of a semifinished hollow engine valve body and a hollow engine valve body according to Embodiment 3. The triangles indicate the size of the inner diameter of the stem part of each of the semifinished hollow engine valve body and the hollow engine valve body, and the dotted line indicates Embodiment 3.

In this embodiment, rotary swaging (rotary plastic working) using a core, necking, and rotary swaging (rotary plastic working) using a core are performed in this described order. Specifically, as shown in FIG. 2, a semifinished hollow engine valve body is subjected to rotary swaging using a core in first step S1 (first rotary plastic working step), then subjected to necking in second step S2 to seventh step S7 (necking step), and thereafter subjected to rotary swaging using a core in eighth step S8 (second rotary plastic working step). More specifically, in this embodiment, rotary swaging using a core is performed in first step S1 as in first step S1 to second step S2 in the method for manufacturing a hollow engine valve according to the first embodiment described above, and necking is performed in second step S2 to seventh step S7 as in third step S3 to eighth step S8 in the first embodiment described above. Thus, description of these is omitted.

In this embodiment, once the inner diameter of the stem part of the semifinished hollow engine valve body reaches near the predetermined size d2 (≥d2) and also the outer diameter reaches near the predetermined size (>d1) as a result of performing the necking on the semifinished hollow engine valve body, rotary swaging is performed with a core set inside the stem part. This process uses a core that matches the size of the inner diameter of the stem part of the semifinished hollow engine valve body adjusted by the necking. Thereby, the outer diameter of the stem part is reduced while the size of the inner diameter is maintained as is. The rotary swaging using the core is performed until the outer diameter of the stem part of the semifinished hollow engine valve body reaches the predetermined size d1. As a result, a hollow engine valve body is obtained. In this embodiment, the rotary swaging using the core is performed in eighth step S8.

Subsequently, the length of the stem part of the hollow engine valve body thus obtained by the above-described rotary swaging is adjusted as needed. Then, as in the method for manufacturing a hollow engine valve according to the first embodiment described above, the tip (upper end) of the stem part of the hollow engine valve body is sealed. As a result, the hollow engine valve (finished product) can be obtained.

Thus, the method for manufacturing a hollow engine valve according to this embodiment can achieve the same operation and effect as those by the method for manufacturing a hollow engine valve according to the first embodiment described above. In addition to this, because rotary swaging is performed after performing necking, it is possible to adjust the outer diameter of the stem part of the semifinished hollow engine valve body to a desired size. Furthermore, it is possible to improve the processing accuracy of the inner diameter of the stem part of the hollow engine valve as compared to methods for manufacturing a hollow engine valve in which necking is performed in the last step.

Embodiment 4

A method for manufacturing a hollow engine valve according to a fourth embodiment of the present invention will be described with reference to FIGS. 1 and 2. In FIG. 2, the crosses indicate the size of the outer diameter of a stem part of each of a semifinished hollow engine valve body and a hollow engine valve body according to Embodiment 4. The triangles indicate the size of the inner diameter of the stem part of each of the semifinished hollow engine valve body and the hollow engine valve body, and the long dashed short dashed line indicates Embodiment 4.

In this embodiment, a semifinished hollow engine valve body is subjected to necking and then subjected to rotary swaging (rotary plastic working). Specifically, as shown in FIG. 2, a semifinished hollow engine valve body is subjected to necking in first step S1 to sixth step S6 (first necking step) and then subjected to rotary swaging using a core in seventh step S7 to eighth step S8 (rotary plastic working step).

A semifinished hollow engine valve body is prepared as in the method for manufacturing a hollow engine valve according to the first embodiment described above. As shown in Part A of FIG. 1, a semifinished hollow engine valve body 10 includes a stem part (body part) 11 and a valve head part forming part 12*a* connected to a lower end portion of the stem part 11. A columnar hole portion 13 is formed from the stem part 11 to a widening portion of the valve head part forming part 12*a*.

First, the semifinished hollow engine valve body is subjected to necking as in the method for manufacturing a hollow engine valve according to the first embodiment described above. Specifically, the semifinished hollow engine valve body is subjected to necking which uses as many dies as the number of narrowing operations to thereby narrow the valve head part forming part and the stem part of the semifinished hollow engine valve body stepwise. The dies are configured to press the valve head part forming part and the stem part and have die holes decreasing in diameter slightly and successively according to the sequence of the operations. As the dies, dies 61, 65 shown in Parts C and D of FIG. 1 or the like are used, for example. This process is performed until the inner diameter of the stem part of the semifinished hollow engine valve body reaches near the predetermined size d2 (≥d2) and also until the outer diameter reaches near a predetermined size (>d1). In this embodiment, the necking is performed in first step S1 to sixth step S6.

Subsequently, the semifinished hollow engine valve body thus obtained by the above-described necking is subjected to rotary swaging with a core set inside the stem part. This process uses a core that matches the size of the inner diameter of the stem part of the semifinished hollow engine valve body adjusted by the necking. Thereby, the outer diameter of the stem part of the semifinished hollow engine valve body is reduced while the size of the inner diameter is maintained as is. The rotary swaging using the core is performed until the outer diameter of the stem part of the semifinished hollow engine valve body mentioned above reaches the predetermined size d1 (>d2). As a result, a hollow engine valve body is obtained. In this embodiment, the rotary swaging using the core is performed in seventh step S7 to eighth step S8.

Subsequently, the length of the stem part of the hollow engine valve body thus obtained by the above-described rotary swaging is adjusted as needed. Then, as in the method for manufacturing a hollow engine valve according to the first embodiment described above, the tip (upper end) of the stem part of the hollow engine valve body is sealed. As a result, the hollow engine valve (finished product) can be obtained.

Thus, in the method for manufacturing a hollow engine valve according to this embodiment, rotary swaging is performed after necking is performed to change the inner diameter of the stem part to a desired size. Therefore, it is possible to adjust the outer diameter of the stem part of the hollow engine valve to a desired size. Moreover, it is possible to improve the processing accuracy of the inner diameter of the stem part of the hollow engine valve as compared to methods for manufacturing a hollow engine valve in which necking is performed in the last step.

Embodiment 5

A method for manufacturing a hollow engine valve according to a fifth embodiment of the present invention will be described with reference to FIG. 2. In FIG. 2, the crosses indicate the size of the outer diameter of a stem part of each of a semifinished hollow engine valve body and a hollow engine valve body according to Embodiment 5. The triangles indicate the size of the inner diameter of the stem part of each of the semifinished hollow engine valve body and the hollow engine valve body, and the long dashed double-short dashed line indicates Embodiment 5.

In this embodiment, necking, rotary swaging (rotary plastic working) using a core, and necking are performed in this described order. Specifically, as shown in FIG. 2, a semifinished hollow engine valve body is subjected to necking in first step S1 to third step S3 (first necking step), then subjected to rotary swaging using a core of a predetermined diameter (>d2) in fourth step S4 to fifth step S5 (rotary plastic working step), and thereafter subjected to necking in sixth step S6 to eighth step S8 (second necking step). More specifically, in this embodiment, necking is performed in first step S1 to third step S3 as in first step S1 to sixth step S6 in the method for manufacturing a hollow engine valve according to the fourth embodiment, described above, and rotary swaging using a core is performed in fourth step S4 to fifth step S5 as in seventh step S7 to eighth step S8 in the fourth embodiment described above. Thus, description of these is omitted.

In this embodiment, once the inner diameter of the stem part of the semifinished hollow engine valve body reaches a predetermined size (>d2) and also the outer diameter reaches a predetermined size (>d1) as a result of performing the necking and then the rotary swaging on the semifinished hollow engine valve body, necking is performed on the semifinished hollow engine valve body thus obtained by the rotary swaging, as in the method for manufacturing a hollow engine valve according to the first embodiment described above. Specifically, the semifinished hollow engine valve body is subjected to necking which uses as many dies as the number of narrowing operations to thereby narrow the valve head part forming part and the stem part of the semifinished hollow engine valve body stepwise. The dies are configured to press the valve head part forming part and the stem part and have die holes decreasing in diameter slightly and successively according to the sequence of the operations. This process is performed until the outer diameter of the stem part of the semifinished hollow engine valve body reaches the predetermined size d1 and also until the inner diameter of the stem part reaches the predetermined size d2 (<d1). As a result, a hollow engine valve body is obtained. In this embodiment, the necking is performed in sixth step S6 to eighth step S8.

Subsequently, the length of the stem part of the hollow engine valve body thus obtained by the above-described necking is adjusted as needed. Then, as in the method for manufacturing a hollow engine valve according to the first embodiment described above, the tip (upper end) of the stem part of the hollow engine valve body is sealed. As a result, the hollow engine valve (finished product) can be obtained.

Thus, in the method for manufacturing a hollow engine valve according to this embodiment, rotary swaging is performed after necking is performed, and necking is further performed after this process. Therefore, it is possible to use a core with a larger diameter in the rotary swaging than those in cases where the stem part of a hollow engine valve is molded by performing rotary swaging after necking is performed. Accordingly, it is possible to reduce complication of the manufacturing work.

Embodiment 6

Figure 3:
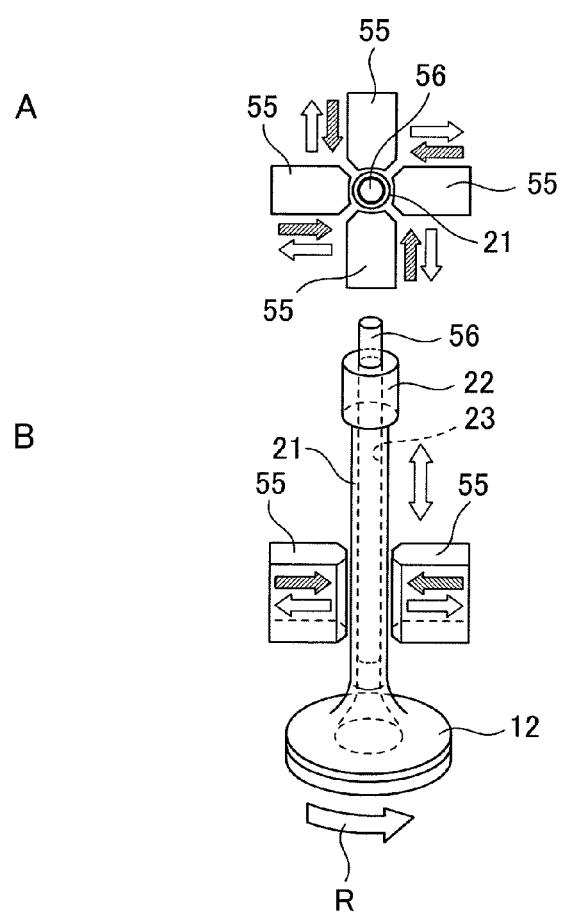
FIG. 3 is a diagram for describing a method for manufacturing a hollow engine valve according to a sixth embodiment of the present invention. Part A of FIG. 3 shows a plan view; and Part B of FIG. 3 shows a perspective view.
Figure 4:
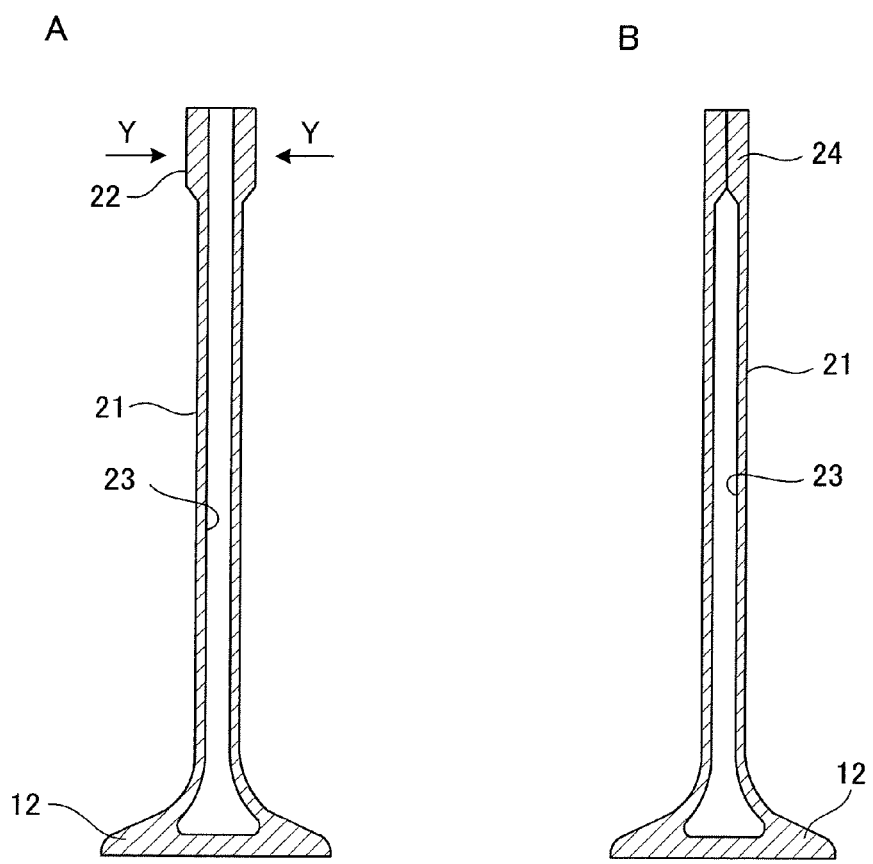
FIG. 4 is a diagram for describing the method for manufacturing a hollow engine valve according to the sixth embodiment of the present invention. Part A of FIG. 4 shows a cross-sectional view of a hollow engine valve before its tip is processed; and Part B of FIG. 4 shows a cross-sectional view of the hollow engine valve after its tip is processed.

A method for manufacturing a hollow engine valve according to a sixth embodiment of the present invention will be described with reference to FIGS. 3 and 4.

In this embodiment, the rotary swaging after performing the necking in the method for manufacturing a hollow engine valve according to the third embodiment or the fourth embodiment described above, is performed not on the whole stem part of the semifinished hollow engine valve body, but only on a portion other than an upper portion. After this process, the upper portion of the stem part is pressed to seal the tip of the stem part.

In this embodiment, once the inner diameter of the stem part of a semifinished hollow engine valve body reaches near the predetermined size d2 (≥d2) and also the outer diameter reaches a predetermined size (>d1) as a result of performing necking on the semifinished hollow engine valve body, rotary swaging is performed with a core set inside the stem part. Specifically, as shown in Parts A and B of FIG. 3, a core 56 is set inside a hole portion 23 of a stem part 21 of the semifinished hollow engine valve body having been subjected to the necking. Then, dies (swaging die) 55 are caused to strike the portion of this stem part 21 other than the upper portion thereof while the core 56 is rotated in a direction R about the axis of the semifinished hollow engine valve body. As a result, the outer diameter of the stem part 21 is reduced while the size of the inner diameter is maintained as is, except the upper portion. On the other hand, the outer diameter of the upper portion of the stem part 21 is maintained at the size before the process and therefore serves as a large diameter portion 22. Note that the inner diameter of the upper portion of the stem part 21 is also maintained at the size before the process.

Subsequently, once the outer diameter of the portion of the stem part 21 of the semifinished hollow engine valve body other than the upper portion reaches the predetermined size d1, the large diameter portion 22 of the stem part 21 is pressed in the directions of arrows Y toward the axis of the stem part 21 in a sealing step as shown in Part A of FIG. 4. As a result, as shown in Part B of FIG. 4, the large diameter portion 22 is pressed and becomes an end sealing portion 24 sealing the tip of the stem part 21.

Thus, the method for manufacturing a hollow engine valve according to this embodiment can achieve the same operations and effects as those by the methods for manufacturing a hollow engine valve according to the third embodiment and the fourth embodiment. In addition to this, because the end of the stem part 21 can be closed by a series of processing operations, it is not necessary to separately prepare a member to close the end of the stem part 21. Accordingly, the manufacturing steps can be simplified.

Figure 5:
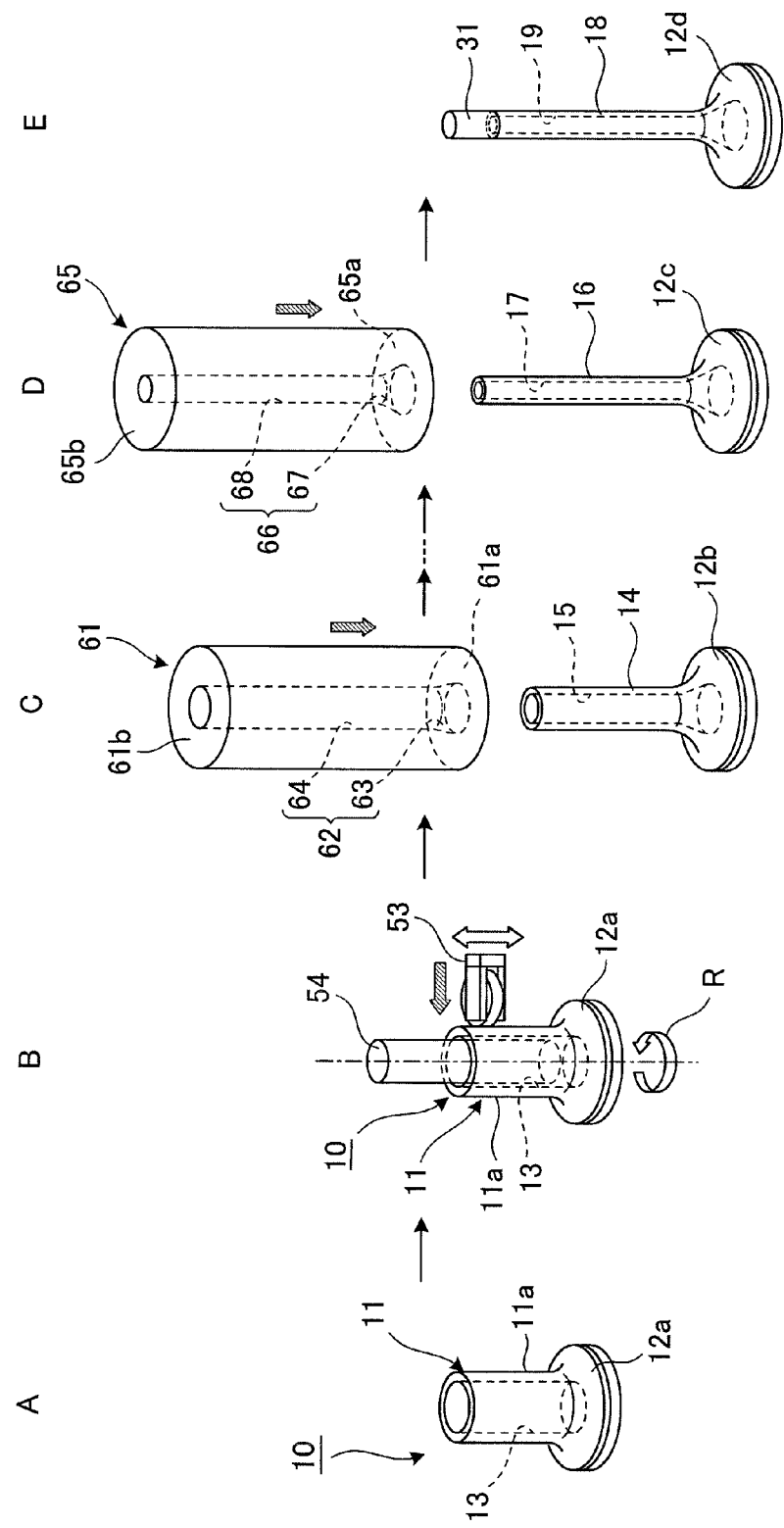
FIG. 5 is a diagram for describing another example of the method for manufacturing a hollow engine valve according to the present invention. Part A of FIG. 5 shows a perspective view of a semifinished hollow engine valve body before processed; Part B of FIG. 5 shows a state during spinning; Part C of FIG. 5 shows a state during the first necking; Part D of FIG. 5 shows a state during the n-th necking; and Part E of FIG. 5 shows a perspective view of a hollow engine product as a finished product.

Note that although the foregoing first to sixth embodiments have described cases where rotary plastic working is rotary swaging, it is possible to use spinning or to use both rotary swaging and spinning as the rotary plastic working. In these cases, too, the same operation and effect as those by the methods for manufacturing a hollow engine valve described above can be achieved. For example, in the rotary plastic working step in the method for manufacturing a hollow engine valve according to the first embodiment described above, spinning may be performed as shown in FIG. 5, instead of the rotary swaging. Specifically, as shown in Part B of FIG. 5, a core 54 is inserted in the hole portion 13 of the semifinished hollow engine valve body 10. Then, a die (spinning die) 53 is pressed against the outer peripheral portion 11a of the stem part 11 while the semifinished hollow engine valve body 10 and the core 54 are rotated together in a direction R about the axis of the semifinished hollow engine valve body 10. As a result, the outer diameter of the stem part of the semifinished hollow engine valve body can be reduced while the size of the inner diameter is maintained as is.

INDUSTRIAL APPLICABILITY

By the method for manufacturing a hollow engine valve according to the present invention, it is possible to manufacture a hollow engine valve having a stem part of a desired thickness relatively easily. Thus, the method for manufacturing a hollow engine valve according to the present invention can be utilized beneficially in the automotive industry and the like.

EXPLANATION OF REFERENCE NUMERALS

10 SEMIFINISHED HOLLOW ENGINE VALVE BODY
11 STEM PART
12a-12c VALVE HEAD PART FORMING PART
12d VALVE HEAD PART
13 HOLE PORTION
14, 16, 18 STEM PART
15, 17, 19 HOLE PORTION
21 STEM PART
22 LARGE DIAMETER PORTION
23 HOLE PORTION
24 END SEALING PORTION
31 SEALING MEMBER
51 DIE
52 CORE (MANDREL)
55 DIE
56 CORE (MANDREL)
61, 65 DIE
62, 66 HOLE PORTION
63, 67 NARROWING PORTION
64, 68 SAME DIAMETER PORTION

The invention claimed is:

1. A method for manufacturing a hollow engine valve having a hollow portion formed from a stem part to a widening portion of a valve head part, characterized in that the method comprises:
a first rotary plastic working step of performing rotary plastic working on a semifinished hollow engine valve body which includes a stem part and a valve head part forming part connected to the stem part, to thereby reduce an outer diameter of the stem part while maintaining the size of an inner diameter thereof as is, the semifinished hollow engine valve body having a columnar hole portion formed from the stem part to a widening portion of the valve head part forming part;

a necking step of, after the first rotary plastic working step, performing necking on the semifinished hollow engine valve body to thereby reduce an outer diameter and an inner diameter of the stem part, the necking using as many dies as the number of narrowing operations to thereby narrow the widening portion of the valve head part forming part and the stem part of the semifinished hollow engine valve body stepwisely, the dies being configured to press the widening portion and the stem part and having die holes with inner diameters decreasing slightly and successively according to a sequence of the operations; and a sealing step of, after the necking step, sealing a tip of the stem part to thereby obtain the hollow engine valve.

2. The method for manufacturing a hollow engine valve according to claim 1, characterized in that the rotary plastic working is any one of: rotary swaging including inserting a core inside the hole portion of the semifinished hollow engine valve body, and striking an outer peripheral portion of the stem part with a swaging die while axially rotating the semifinished hollow engine valve body and the core together; and spinning including inserting a core inside the hole portion of the semifinished hollow engine valve body, and pressing a spinning die against the outer peripheral portion of the stem part while axially rotating the semifinished hollow engine valve body and the core together.

3. The method for manufacturing a hollow engine valve according to claim 1, characterized in that the rotary plastic working is a combination of:

performing any one of rotary swaging including striking an outer peripheral portion of the stem part with a swaging die while axially rotating the semifinished hollow engine valve body, and spinning including pressing a spinning die against the outer peripheral portion of the stem part while axially rotating the semifinished hollow engine valve body; and performing, after the any one of the rotary swaging and the spinning, any one of rotary swaging including inserting a core inside the hole portion of the semifinished hollow engine valve body, and striking the outer peripheral portion of the shaft part with a swaging die while axially rotating the semifinished hollow engine valve body and the core together, and spinning including inserting a core inside the hole portion of the semifinished hollow engine valve body, and pressing a spinning die against the outer peripheral portion of the stem part while axially rotating the semifinished hollow engine valve body and the core.

4. The method for manufacturing a hollow engine valve according to claim 1, characterized in that the method further comprises a second rotary plastic working step of performing rotary plastic working on the semifinished hollow engine valve body after performing the necking thereon, to thereby reduce the outer diameter of the stem part while maintaining the size of the inner diameter thereof as is.

5. The method for manufacturing a hollow engine valve according to claim 4, characterized in that the rotary plastic working in the second rotary plastic working step is any one of: rotary swaging including inserting a core inside the hole portion of the semifinished hollow engine valve body, and striking an outer peripheral portion of the stem part with a swaging die while axially rotating the semifinished hollow engine valve body and the core together; and spinning including inserting a core inside the hole portion of the semifinished hollow engine valve body, and pressing a spinning die against the outer peripheral portion of the stem part while axially rotating the semifinished hollow engine valve body and the core together.

6. The method for manufacturing a hollow engine valve according to claim 4, characterized in that the rotary plastic working in the second rotary plastic working step is performed only on a portion of the stem part other than an upper portion thereof, so that the outer diameter of the stem part is reduced while the size of the inner diameter thereof is maintained as is except the upper portion, whereas the outer diameter of the upper portion of the stem part is maintained at the size thereof before the rotary plastic working to thereby form a large diameter portion, and in the sealing step, the large diameter portion is pressed to seal a tip of the stem part and thereby obtain the hollow engine valve.

7. A method for manufacturing a hollow engine valve having a hollow portion formed from a stem part to a widening portion of a valve head part, characterized in that the method comprises:

a first necking step of performing necking on a semifinished hollow engine valve body which includes a stem part and a shaft head part forming part connected to the stem part and has a columnar hole portion formed from the stem part to a widening portion of the valve head part forming part, to thereby reduce an outer diameter and an inner diameter of the stem part, the necking using as many dies as the number of narrowing operations to thereby narrow the widening portion of the valve head part forming part and the stem part of the semifinished hollow engine valve body stepwisely, the dies being configured to press the widening portion and the stem part and having die holes with inner diameters decreasing slightly and successively according to a sequence of the operations;

a rotary plastic working step of, after the first necking step, performing rotary plastic working on the semifinished hollow engine valve body to thereby reduce an outer diameter of the stem part while maintaining the size of an inner diameter thereof as is; and a sealing step of, after the rotary plastic working step, sealing a tip of the stem part to thereby obtain the hollow engine valve.

8. The method for manufacturing a hollow engine valve according to claim 7, characterized in that the rotary plastic working is any one of: rotary swaging including inserting a core inside the hole portion of the semifinished hollow engine valve body, and striking an outer peripheral portion of the stem part with a swaging die while axially rotating the semifinished hollow engine valve body and the core together; and spinning including inserting a core inside the hole portion of the semifinished hollow engine valve body, and pressing a spinning die against the outer peripheral portion of the stem part while axially rotating the semifinished hollow engine valve body and the core together.

9. The method for manufacturing a hollow engine valve according to claim 7, characterized in that the method further comprises a second necking step of, after performing the rotary plastic working on the semifinished hollow engine valve body, performing necking to thereby reduce the outer diameter and the inner diameter of the stem part, the necking using as many dies as the number of narrowing operations to thereby narrow the widening portion of the valve head part forming part and the stem part of the semifinished hollow engine valve body stepwisely, the dies being configured to press the widening portion and the stem part and having die holes with inner diameters decreasing slightly and successively according to a sequence of the operations.

10. The method for manufacturing a hollow engine valve according to claim 7, characterized in that the rotary plastic working is performed only on a portion of the stem part other than an upper portion thereof, so that the outer diameter of the stem part is reduced while the size of the inner diameter thereof is maintained as is except the upper portion, whereas the outer diameter of the upper portion of the stem part is maintained at the size thereof before the rotary plastic working to thereby form a large diameter portion, and in the sealing step, the large diameter portion is pressed to seal a tip of the shaft part and thereby obtain the hollow engine valve.

* * * * *